United States Patent [19]
Johnson

[11] 3,836,935
[45] Sept. 17, 1974

[54] MOISTURE SEAL FOR ELECTRICAL CONNECTOR

[75] Inventor: Frederick W. Johnson, Cedar Rapids, Iowa

[73] Assignee: Collins Radio Company, Dallas, Tex.

[22] Filed: June 1, 1973

[21] Appl. No.: 365,880

Related U.S. Application Data

[62] Division of Ser. No. 198,920, Nov. 15, 1971, Pat. No. 3,781,764.

[52] U.S. Cl. .......................... 339/17 LM, 339/94 M
[51] Int. Cl. .............................................. H05k 1/02
[58] Field of Search ...... 317/101 CC; 174/138, 153; 339/17, 18, 59–63, 94, 103, 210, 211, 176, 214, 215, 195, 196

[56] References Cited

UNITED STATES PATENTS 2,619,515 11/1952 Doane .............................. 339/94 M
3,136,591 6/1964 Just et al........................ 339/17 LM
3,272,952 9/1966 McKeon ............................. 174/153
3,457,441 7/1969 Phillips et al. ....................... 339/103

*Primary Examiner*—Bobby R. Gay
*Assistant Examiner*—Terrell P. Lewis
*Attorney, Agent, or Firm*—Robert J. Crawford

[57] ABSTRACT

Disclosed is a printed circuit board interconnect system having moisture seal means for precluding the formation of a moisture film between electrical contacts. The seal means comprises a resilient seal strip having one or more integral hollow seals disposed on either side thereof, each hollow seal surrounding a male connecting pin of the system and being compressed between printed circuit boards that are electrically connected.

6 Claims, 10 Drawing Figures

MOISTURE SEAL FOR ELECTRICAL CONNECTOR

This is a division of application Ser. No. 198,920, filed Nov. 15, 1971, now U.S. Pat. No. 3,781,764.

This invention relates in general to electrical interconnect systems and in particular to systems for electrically interconnecting printed circuit boards in modular fashion so that each of the boards may be readily connected and disconnected.

In the past decade, numerous pin and socket electrical interconnect systems have been developed for facilitating interchangeability of electrical component box units. In the printed circuit board field, the boxes consist of multiple side or interconnect boards and associated printed circuit component boards or cards, usually all of the multilayer circuit variety and detachably plugged together. Such interconnect systems are well known as exemplified by U.S. Pat. application No. 92,772, filed Nov. 25, 1970, now U.S. Pat. No. 3,663,931 and assigned to the assignee of this invention, and by U.S. Pat. No. 3,270,251.

Because of the high density and corresponding close proximity of electrical contacts, the application of these interconnect systems in environments subject to high humidity and temperature variations may not be satisfactory due to the formation of a moisture film between contacts which lowers the insulation resistance and jeopardizes complex circuit operations. No known means has been available for solving this problem.

It is therefore an object of this invention to provide an interconnect system of the type described with a moisture sealing arrangement which will prevent moisture condensate from bridging adjacent contacts.

It is another object to provide new and unique moisture seals for use in a wide variety of interconnect systems.

In one preferred embodiment of the invention, a printed circuit interconnect board is disclosed having a plurality of electrical male connecting pins perpendicularly extending therefrom. A low spring-rate resilient seal of dielectric material surrounds each of the connecting pins of the interconnect board. A printed circuit component board has mounted thereon one or more connectors each of which is comprised of an elongated dielectric contact housing containing a plurality of spaced electrical female sockets. Each of the sockets includes spring biased electrical contact means which form an opening for frictionally receiving one of the male connecting pins of the interconnect board such that the interconnect board and the printed circuit component boards are held in spaced relationship and separated by the resilient seals, the seals being compressed between the board and the connector to form a moisture seal between contacts.

This and other preferred embodiments of the invention are described in more detail in the following specification with reference to the accompanying drawings in which:

FIG. 1(*b*) is a cross sectional view of the novel moisture seal of the invention taken along the section line 1—1 of FIG. 1(*a*);

Figures 2A, 2B:
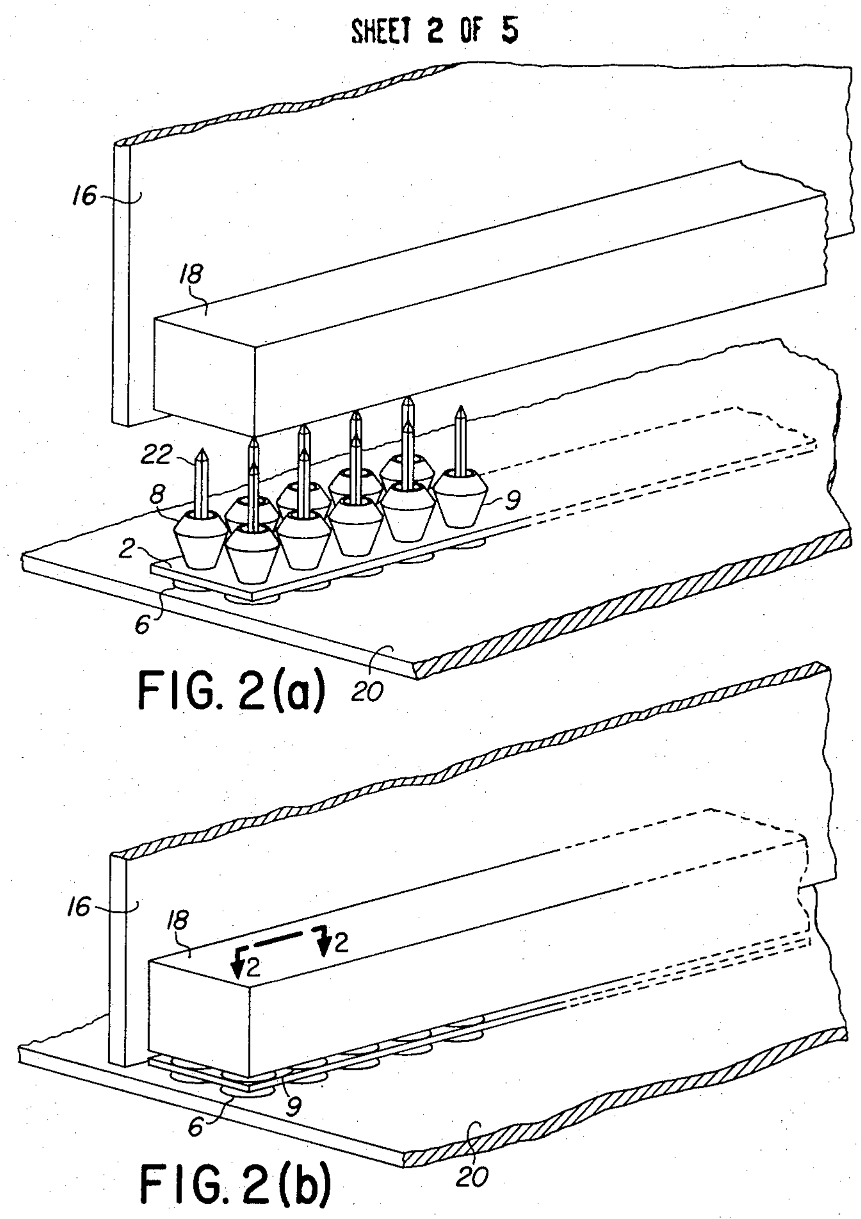
FIG. 2(*a*) is a pictorial view of one embodiment of the invention showing a printed circuit board with a single connector thereon in spaced relationship to an interconnect board having perpendicular connecting pins extending therefrom and through the integral moisture seal.
Figure 2C:
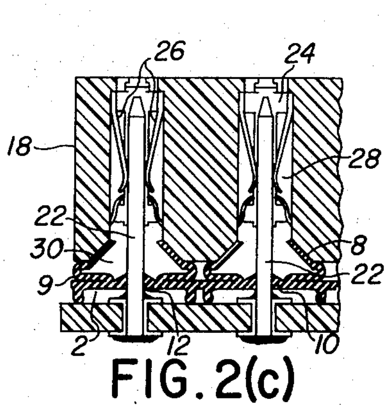
Figure 3A:
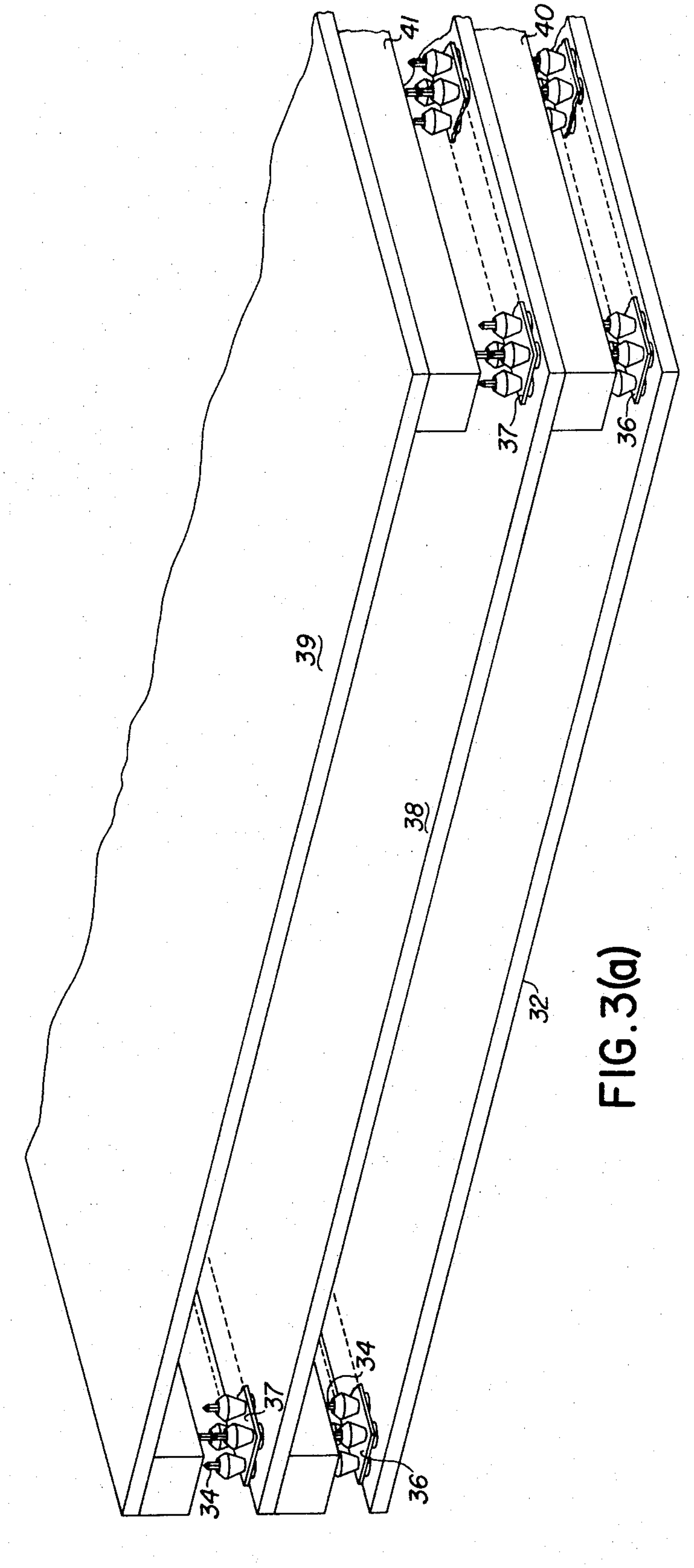
Figures 3B, 3C:
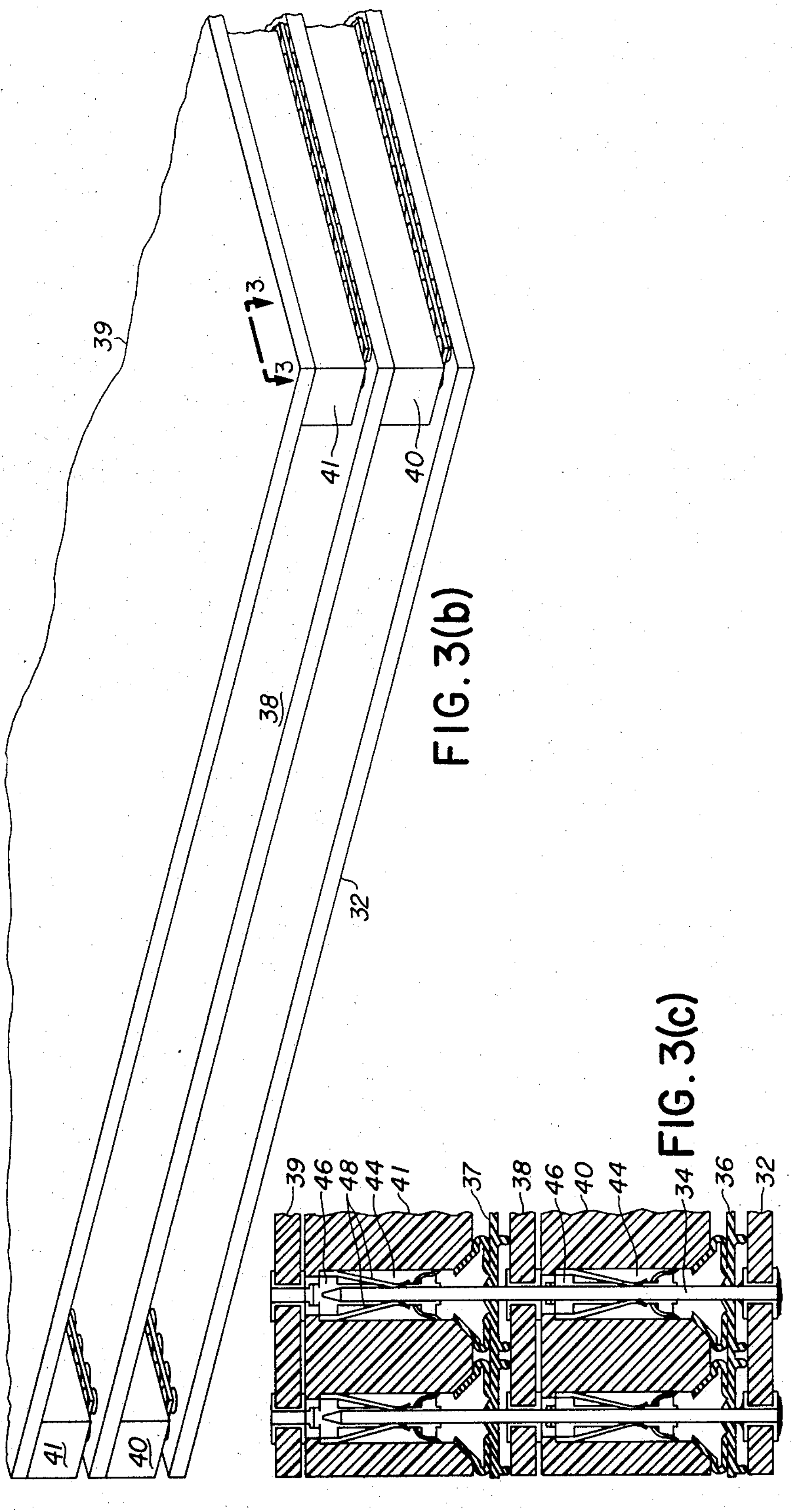
Figure 4A:
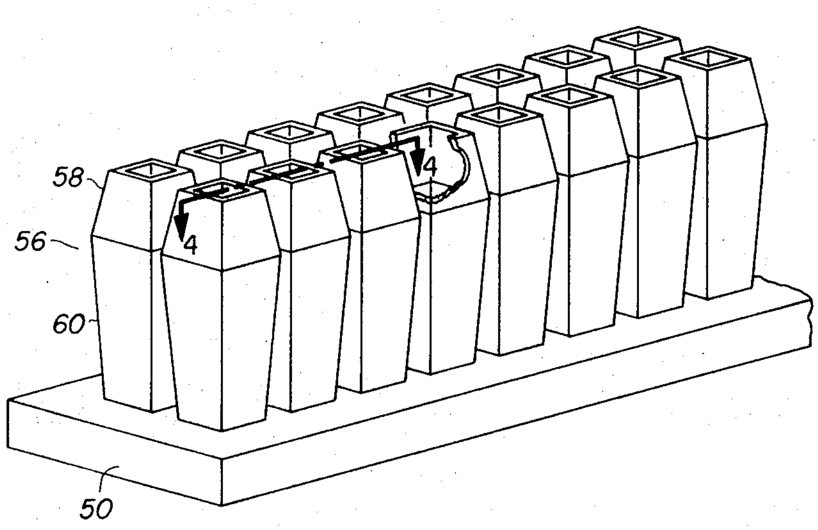
Figure 4B:
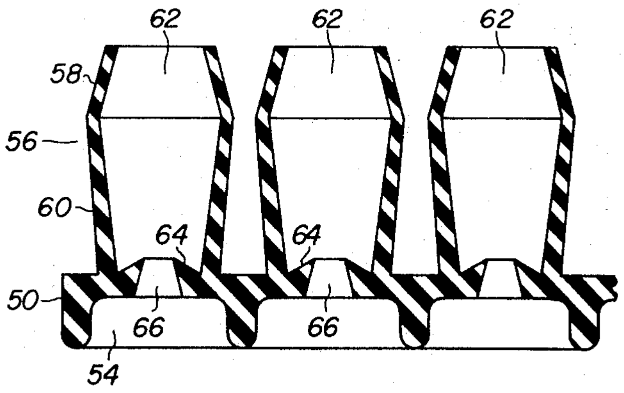

FIG. 2(*b*) pictorially illustrates the components of FIG. 2(*a*) in assembled relation;

FIG. 2(*c*) is a cross section taken along line 2—2 of FIG. 2(*b*);

FIG. 3(*a*) is an exploded pictorial view of a plurality of printed circuit component boards to be parallel mounted with an interconnect board;

FIG. 3(*b*) illustrates the interconnect system of FIG. 3(*a*) in assembled condition;

FIG. 3(*c*) is a cross section taken along lines 3—3 of FIG. 3(*b*);

FIG. 4(*a*) is a pictorial view of an alternative moisture seal; and

FIG. 4(*b*) is a sectional view taken along line 4—4 of FIG. 4(*a*).

Figure 1A:
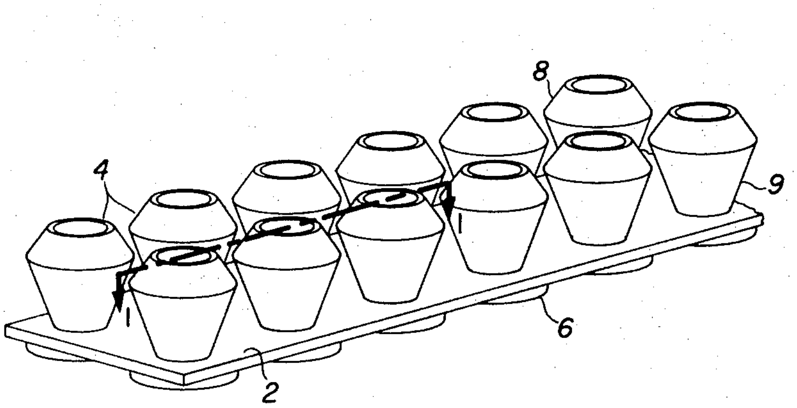
FIG. 1(*a*) is a pictorial view of the preferred integral seal of this invention.
Figure 1B:
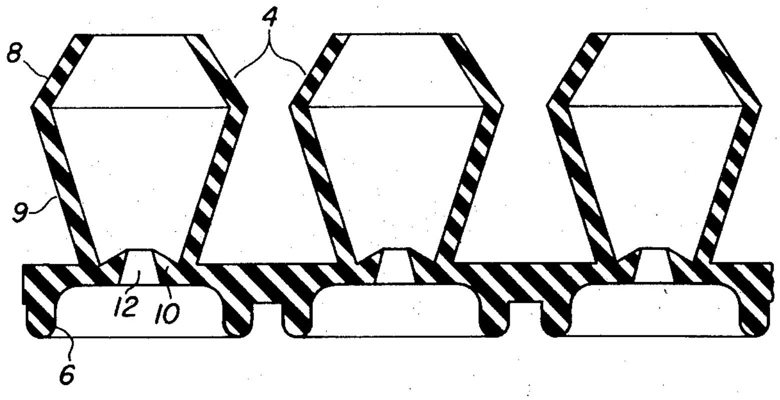

In FIGS. 1(*a*) and 1(*b*), a preferred moisture seal of this invention is comprised of a carrier strip 2 having a plurality of hollow and generally cylindrical or O ring shaped seals 6 extending from the bottom side of the strip, and a plurality of bellows type hollow seals 4 extending from the top side of the strip. These bellows-like seals embody the principle of controlled collapse providing relatively uniform axial sealing force over an extended range of travel. The axes of the oppositely located hollow seals are in alignment and of predetermined spacing. Obviously the strip 2 could be severed into segments comprised of any desired number of opposite hollow seals. The seal may be constructed of any suitable resilient dielectric material which will not be adversely affected by temperatures varying between −55° C to 125° C, the particular resiliency and temperature characteristics being determined by the type connectors with which the seal is used and by the environment to which the seal will be subjected. One suitable material is the Class III, Grade 50, silicone rubber defined by Federal Specification ZZR-765.

With particular reference to FIG. 1(*b*), the bellows type seal 4 is in the shape of two inverted frustums 8 and 9; i.e., two frustums adjoining each other at their maximum cross sectional dimensions. The bellows type seal and the opposed O ring type seal surround a diaphragm portion 10 of the carrier strip 2. The diaphragm 10 has a hole 12 which joins the cavities formed by the O ring and bellows type seals, the common axes of the opposed seals passing through the center of the holes. It should be noted that the holes 12 are smaller in cross section than the male connecting pins to be inserted through the holes, thereby forming a moisture resistant seal between the pins and the diaphragms.

Referring to FIG. 2(*a*), illustrated is a printed circuit component board 16 having connector 18 mounted thereon in conventional manner (not disclosed). While it is not illustrated, as well known in the art a printed circuit component board 16 traditionally carries a plurality of semiconductor and/or other discrete components, the board usually being of laminated structure having varied interconnect circuitry within the multilayer circuit planes. Also shown in simplified fashion is a printed circuit interconnect board 20 having a plurality of pins 22 extending perpendicularly therefrom. Again in known fashion the pins 22 are soldered to plated through holes in the interconnect board and are in predetermined electrical contact with circuitry carried by the board. While the board is referred to herein as an interconnect board as it carries the male connecting pins, it should be noted that it also may carry components in the same sense as does a component board. The moisture seal strip 2 is illustrated having the connecting pins 22 extending through the O ring seal 6, hole 12 and bellows seal 4 of the carrier strip.

FIG. 2(*b*) illustrates the printed circuit component board and the printed circuit interconnect board plugged together in the intended manner, and FIG. 2(*c*) is a cross sectional view taken along line 2—2 of FIG. 2(*b*) to illustrate the interrelationship of parts in more detail. As shown in FIG. 2(*c*), the connector housing 18 has a plurality of cavities 28 each containing a female electrical socket 24, each socket having opposed spring arms 26 in frictional engagement with connecting pins 22. Cavities 28 have an enlarged lead-in cavity 30 for guiding the male pins and receiving the conjugate frustum 8 of the bellows 4. It will be noted that when the printed circuit component board and the printed circuit interconnect boards are pressed together the seal is compressed to form a moistureproof junction between the lead in cavities 30 of the connector and the frustums 8 of the seals 4, between the pins 22 and the diaphragm 10 and between O ring seal 6 and the surface 17 surrounding the plated through holes of the interconnect board 16. By constructing the bellows seal 4 with the frustum 8, a long creepage path is provided along the entire length of frustums 8 and the walls of cavities 30. Therefore while a single frustum or cylindrical type seal could be used in place of bellows seal 4 as shown, the preferred seal shape provides a low spring rate seal with the highest moisture resistance between contacts. The frictional force between spring arms 26 and connecting pins 22 is sufficient to hold the boards together against the forces of this seal, and it is readily apparent that each contact has its own moistureproof seal from the adjacent contact. Therefore each contact is isolated from all other contacts by two insulation elements; i.e., its own surround seal and the surround seal of the other contact.

Rather than mounting printed circuit boards perpendicular to one another as shown in FIGS. 2(*a*), 2(*b*) and 2(*c*), it is often desirable to mount the boards in parallel. Such an arrangement is shown in FIGS. 3(*a*), 3(*b*) and 3(*c*). Shown in an exploded pictorial view in FIG. 3(*a*) is a printed circuit interconnect board 32 having connecting pins 34 and an associated carrier strip 36. Illustrated in spaced relationship are two printed circuit component boards 38 and 39 each having connectors 40 and 41, respectively, the connecting pins 34 passing through the connectors 40 and board 38. Additional carrier strips 37 are mounted on the pins 34 between boards 38 and 39. FIG. 3(*b*) shows the boards in assembled form, and FIG. 3(*c*) is a cross sectional view taken along line 3—3 of FIG. 3(*b*) illustrating in detail the arrangement of parts. The connector housings 40 and 41, connector cavities 44, sockets 46 and opposed spring arms 48 are as illustrated in FIGS. 2(*a*), 2(*b*) and 2(*c*). It will be observed, however, that connecting pins 34 are of sufficient length to extend completely through the lower printed circuit component board to engage the spring arms 48 of connectors 40 and 41. The seals cooperate with the printed circuit boards and connector housings in the same precise fashion as described with respect to FIGS. 2(*a*), 2(*b*) and 2(*c*).

While not described in detail it should be realized that the moisture seals of this invention could be utilized with the integral pin and socket connector arrangement as described in detail in the aforementioned U.S. Pat. application Ser. No. 92,772 filed Nov. 25, 1970, now U.S. Pat. No. 3,663,931.

FIGS. 4(*a*) and 4(*b*) illustrate an alternative moisture seal which is particularly useful with highly dense contact arrangements, such as, for example where the connecting pins of FIGS. 2 and 3 are on one tenth inch centers. Carrier strips 50 has ribs 52 extending from the bottom side defining hollow seats having cavities 540 Extending from the top of the carrier strip are bellows type seals 56 each comprised of inverted frustums 58 and 60 which form cavities 62. It will be noted that the cross section of frustums 58 and 60 are rectangular in shape and particularly adapted for contacting the rectangular lead in cavities 30 and 62 of the connectors 18 and 40 of FIGS. 2 and 3. The cavities formed by bellows seals 56 are each opposite a rectangularly shaped cavity 54 formed by the ribs 52, opposed cavities being joined by holes 66 through diaphragms 64. The axes of opposed cavities 54 and 62 and holes 64 are in alignment.

While certain preferred cross sectional shapes for the lower and top seals of the carrier strip have been illustrated for use with particular interconnect systems, it is contemplated that different cross sectional shapes may be used with the disclosed and other similar systems without departure from the teachings herein.

I claim:

1. An electrical interconnect system for interconnecting printed circuit boards comprising: a printed circuit interconnect board having a plurality of electrical male connecting pins extending perpendicularly therefrom; resilient seal means of electrically insulating material surrounding each of said connecting pins said resilient seal means comprising a carrier strip having integral hollow seals on either side thereof, each seal on one side of the strip having its axis aligned with the axis of one of the seals on the other side of the strip, with each aligned axis of opposite seals passing through a hole in said strip, and wherein each of said connecting pins pass through one of said holes in the seal to frictionally engage said carrier strip; and a printed circuit component board having at least one dielectric contact housing mounted thereon, each said housing containing a plurality of spaced electrical socket means, each of said socket means including spring biased electrical contact means frictionally receiving one of said male connecting pins such that said interconnect board and said printed circuit component board are held in spaced relationship with said seal means compressed between said interconnect board and said housing.

2. An electrical interconnect system as in claim 1 wherein each of said seals on said one side of the carrier strip is generally cylindrical in shape and each of the seals on the other side of said strip has the shape of two inverted frustums.

3. An electrical interconnect system as in claim 1 wherein each of said seals on said one side of said strip are rectangular in shape and each of said seals on the other side of said strip have the shape of two inverted frustums.

4. An electrical interconnect system for interconnecting printed circuit boards comprising: a printed circuit board having a plurality of electrical male connecting pins extending perpendicularly therefrom; a plurality of printed circuit component boards each having at least one dielectric housing mounted thereon, each said housing containing a plurality of spaced electrical socket means, each of said socket means including spring biased electrical contact means forming an opening for receiving a male connecting pin, each of said component boards having an opening therethrough in alignment with the opening in each of said socket means, each of said component boards and said interconnect board being aligned in parallel relationship and having said connecting pins inserted through said holes in said sockets and said boards; and resilient seal means of electrical insulating material surrounding each of said connecting pins between adjacent parallel boards said resilient seal means comprising a carrier strip having integral hollow seals on eitherside thereof, each seal on one side of the strip having its axis aligned with the axis of one of the seals on the other side of the strip, with each aligned axis of opposite seals passing through a hole in said strip, and wherein each of said connecting pins passes through one of said holes in the seal, said sockets and said connecting pins holding said parallel boards in such relationship that each of said seals is compressed between said boards.

5. An electrical interconnect system as in claim 4 wherein each of said seals on one side of the carrier strip is generally cylindrical in shape and each of the seals on the other side of said strip has the shape of two inverted frustums.

6. An electrical interconnect system as in claim 4 wherein each of said seals on one side of said strip is rectangular in shape and each of said seals on the other side of said strip has the shape of two inverted frustums.

* * * * *